US 6,513,256 B1
(12) United States Patent
Tischler

(10) Patent No.: US 6,513,256 B1
(45) Date of Patent: Feb. 4, 2003

(54) DEVICE FOR MOVING OBJECTS IN ORDER TO COMPARE THE DIMENSIONS OF SAID OBJECTS AND METHOD FOR COMPARING DIMENSIONS USING SAME

(75) Inventor: Karl Tischler, Lausanne (CH)

(73) Assignee: Brown & Sharpe Tesa SA, Renens (CH)

( * ) Notice: Subject to any disclaimer, the term of this patent is extended or adjusted under 35 U.S.C. 154(b) by 26 days.

(21) Appl. No.: 09/856,510
(22) PCT Filed: Nov. 2, 2000
(86) PCT No.: PCT/CH00/00586
§ 371 (c)(1),
(2), (4) Date: Jun. 15, 2001
(87) PCT Pub. No.: WO01/33160
PCT Pub. Date: May 10, 2001

(30) Foreign Application Priority Data

Nov. 4, 1999 (EP) .......................................... 99811013

(51) Int. Cl.$^7$ ................................................ G01B 1/00
(52) U.S. Cl. ..................... 33/549; 33/1 M; 33/1 BB; 33/545; 33/501.05
(58) Field of Search ........................... 33/549, 551–555, 33/1 BB, 546–548, 1 M, 501.02, 501.03, 501.05

(56) References Cited

U.S. PATENT DOCUMENTS

| 3,214,838 A | * | 11/1965 | Skundberg | 33/501.05 |
| 3,744,139 A | * | 7/1973 | Bibl | 33/546 |
| 3,863,350 A | * | 2/1975 | Solaroli | 33/556 |
| 3,889,380 A | * | 6/1975 | Albertazzi | 209/598 |
| 3,974,569 A | * | 8/1976 | Albertazzi | 33/501.05 |
| 4,150,490 A | * | 4/1979 | Sluka | 33/1 H |
| 4,233,740 A | * | 11/1980 | Bunn et al. | 248/913 |
| 4,611,408 A | * | 9/1986 | Plante | 33/552 |
| 5,014,440 A | * | 5/1991 | Lessi et al. | 33/552 |
| 5,024,002 A | * | 6/1991 | Possati | 248/676 |
| 5,095,634 A | * | 3/1992 | Overlach et al. | 33/543 |
| 5,116,234 A | * | 5/1992 | Bertz et al. | 33/550 |
| 5,313,714 A | * | 5/1994 | Nakao | 33/522 |
| 5,806,199 A | * | 9/1998 | King | 33/552 |
| 6,038,779 A | * | 3/2000 | Lee et al. | 33/1 M |
| 6,062,062 A | * | 5/2000 | Toida et al. | 33/502 |
| 6,186,024 B1 | * | 2/2001 | Leiber | 108/143 |

FOREIGN PATENT DOCUMENTS

| EP | 0018945 A1 | 11/1980 |
| EP | 0115243 A1 | 8/1984 |
| EP | 0887618 A2 | 12/1998 |
| FR | 2554854 | 10/1984 |
| FR | 2620815 | 3/1989 |

OTHER PUBLICATIONS

Patent Abstracts of Japan, vol. 1996, No. 4, Apr. 30, 1996, & JP07324904A (Mitsutoyo Corp), Dec. 12, 1995.

* cited by examiner

Primary Examiner—Diego Gutierrez
Assistant Examiner—Yaritza Guadalupe
(74) Attorney, Agent, or Firm—Jacobson Holman PLLC

(57) ABSTRACT

The invention relates to a device for displacement of blocks, with a view to comparison of their dimensions by means of a measuring apparatus, which device includes a support, referred to as the measuring table, which defines a supporting and sliding plane for the blocks, a piece, referred to as the template, situated above the measuring table and bearing stops disposed in order to maintain the blocks in a predetermined position and orientation relative to the measuring apparatus, by cooperating with the lateral faces of the blocks, while preserving their free support on the measuring table, and is carried by a guide device along at least one axis parallel to the pressing plane, this device being characterized in that the template is made up of two separate parts which can be displaced separately from one another.

10 Claims, 3 Drawing Sheets

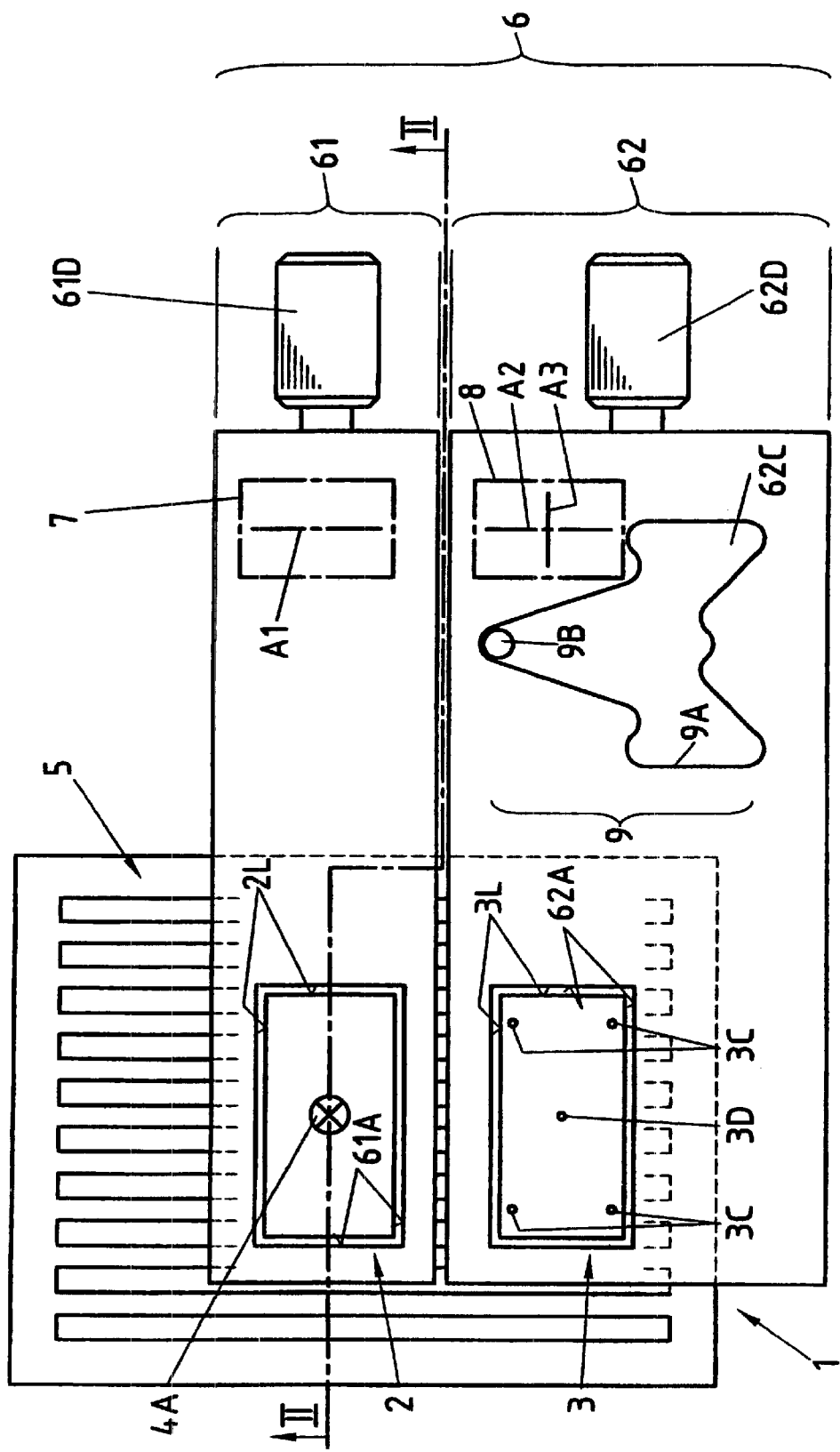

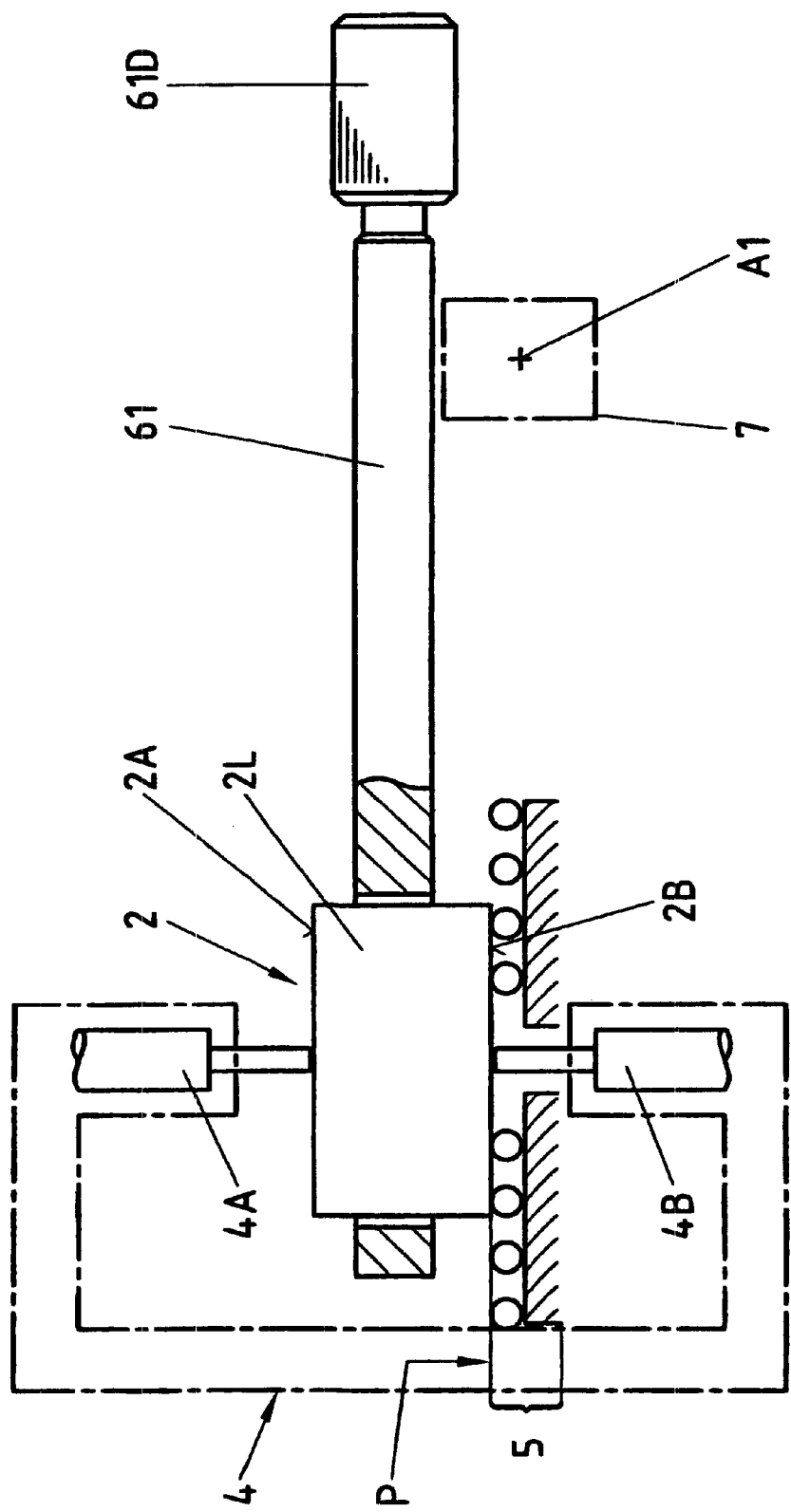

DEVICE FOR MOVING OBJECTS IN ORDER TO COMPARE THE DIMENSIONS OF SAID OBJECTS AND METHOD FOR COMPARING DIMENSIONS USING SAME

FIELD OF THE INVENTION

This invention relates to a device for displacement of at least two objects for the comparison of dimensions of these objects by means of a measuring apparatus and to a method for the comparison of dimensions by means of the aforementioned device.

The invention concerns particularly, but not exclusively, the field of dimensional control of gauge blocks, it being a matter of new blocks or of blocks which have already been used.

The device pertains preferably to the conventional comparison of a reference block and a block to be measured of the same length, but also the comparison of a single reference block and blocks to be measured of different lengths.

BACKGROUND OF THE INVENTION

A gauge block is an object which has at least two parallel faces spaced apart by a very precise distance, referred to as length.

Gauge blocks are objects of very high precision which are currently used, for example, in workshops for mechanical manufacture, in particular for measuring lengths.

In terms of the ISO 3650 standard, a gauge block is a materialized measuring unit, usually of rectangular section, made of a material resistant to wear and tear, having two flat measurement faces parallel to each other, which must be able to adhere to measurement faces of other gauge blocks for making up assemblies, or to flat surfaces of the same finish of auxiliary surface planes used for length measurements.

Likewise in the terms of the ISO 3650 norm, the length of a gauge block, by convention, is the distance between each particular point of a measuring face and the flat surface of an auxiliary plane of the same material and of the same state of surface on which the other measuring face is attached.

Such gauge blocks are frequently manipulated and placed in contact with one another and/or in contact with other objects.

These mechanical contacts cause a progressive wear and tear of the faces of the blocks that determine their length.

Such wear and tear, however minute it is, changes therefore the length of the blocks, and leads to errors in measurement.

It is thus imperative that the blocks be periodically checked so that those which show abnormal wear and tear can be pinpointed in view of removing them from use.

For this check, it is known to compare, on the one hand, the spacing of the opposite faces which determine the length of each block used with, on the other hand, the spacing of opposite faces of a reference block.

Conventionally, the measurement of the length of a block is carried out between points of a plurality of pairs of points, for example, for a right-angled parallelepiped-shaped block, between points situated at the vertices of diagonals of opposite faces and between points situated at the intersection of diagonals of these faces.

SUMMARY OF THE INVENTION

To this end, a device is put in operation comprising:
a support, referred to as a measuring table, which defines a common supporting and sliding plane for the reference block and the block to be measured, and this for one of their faces concerned by the measurement,
a piece, referred to as a template, which is, on the one hand, situated above for maintaining the blocks in a predetermined position and orientation, by cooperating with the lateral faces of the blocks, and this while preserving their free support on the measuring table, and, on the other hand, is borne by a means of guiding along two intersecting axes parallel to the support plane in such a way as to allow a simultaneous displacement of the blocks.

The device preferably includes a means of assistance in guiding the displacement of the template along a preferred course for causing a simultaneous displacement of the two blocks in a way as to allow
the positioning of the reference block between two sensing elements of the measuring apparatus so as to allow a reading on this block by contact of the said sensing elements each on one of the opposite faces of the block,
the displacement of the reference block and that of the block to be checked in such a way as to substitute them, the one for the other, and to present the block to be checked between the said sensing elements, and this successively in each of the reading positions.

A measuring apparatus equipped with such a displacement device is extremely reliable, and its use is also easy and quick.

This state-of-the-art device gives good results, but it is faulted for causing a certain wear and tear on each reference block because the latter remains in contact on the measuring table during the readings carried out on the block to be checked.

A result which the invention aims to obtain is specifically a device for displacement of blocks which, while having all the advantages of the known device, noticeably reduces the wear and tear on the reference block.

To this end, the invention has as its subject matter a displacement device characterized in particular in that the template is made up of at least two separate parts which can be displaced separately from one another, of which:
a first part that comprises the stops intended for lateral maintenance of the reference block on the measuring table, and
at least one further part, referred to as the second part, that comprises the stops intended for lateral maintenance of at least one block to be checked.

The invention likewise has as its subject matter a method for comparison of dimensions by means of the aforementioned displacement device.

BRIEF DESCRIPTION OF THE DRAWINGS

The invention will be better understood from reading the following description, given by way of non-limiting example, with reference to the attached drawing which shows schematically:

FIG. 1: the device according to the invention in a view from above,

FIG. 2: the device according to the invention seen laterally,

DETAILED DESCRIPTION OF THE PREFERRED EMBODIMENTS

Figure 3A:
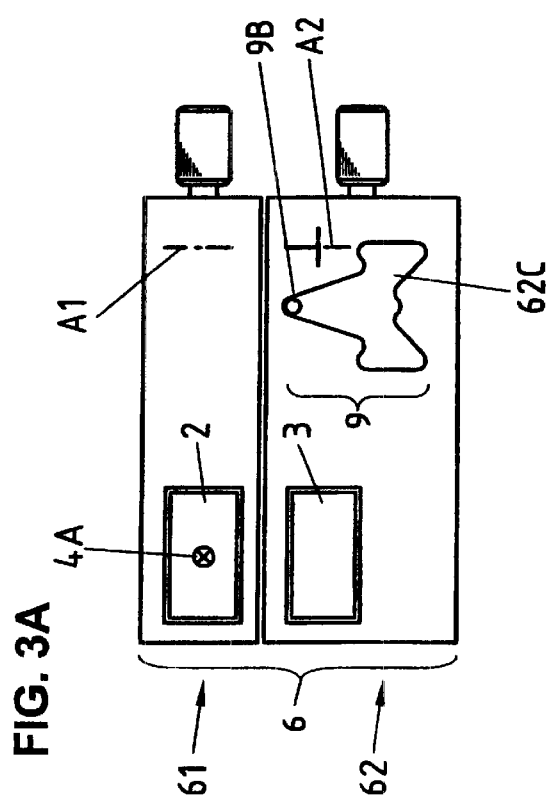
FIGS. 3A to 3C: the device according to the invention, in a view from above and on a reduced scale, shown in three phases of use.

Referring to the drawing, one sees a device 1 for displacement of at least two objects 2, 3, called blocks, with a view to the comparison of dimensions of these blocks by means of a measuring apparatus 4.

More specifically, the objects 2, 3 are gauge blocks, i.e. blocks which each have at least two parallel faces 2A, 2B, 3A, 3B, spaced apart by a very precise distance, referred to as length.

In the description which follows, the term block is used to designate in general objects which have two parallel opposite faces 2A, 2B, 3A, 3B spaced apart by a predetermined distance.

The displacement device 1 is intended to be equipped with a measuring apparatus 4 for checking the length of a plurality of blocks 3, and this by comparison, on the one hand, of the spacing of the opposite faces 3A, 3B that determine the length of each block 3 to be checked with, on the other hand, the spacing of opposite faces 2A, 2B of a reference block 2.

The device 1 comprises:

a support 5, referred to as the measuring table, which defines a common supporting and sliding plane P for the reference block 2 and the block to be checked 3, and this for one 2A, 3A of their faces 2A, 2B, 3A, 3B concerned by the measurement, a piece 6, referred to as the template, which is, on the one hand, situated above the measuring table 5 and bears stops 61A, 62A disposed for maintaining the blocks in a predetermined position and orientation relative to the measuring apparatus 4, by cooperating with the lateral faces 2L, 3L of the blocks, while preserving their free support on the measuring table 5, and, on the other hand, is movable above this table 5, in particular in such a way as to allow a displacement of the blocks 2, 3 on the said measuring table 5 in order to bring them to the level of at least one sensing element 4A, 4B of the measuring apparatus 4.

The piece 6, referred to as the template, is preferably movable along at least one axis A1, A2, A3 parallel to the supporting plane P, in such a way as to allow a displacement of the blocks 2, 3 on the said measuring table 5 in order to be able to place these in contact with at least one sensing element 4A, 4B of the measuring apparatus 4.

For example, the measuring table 5 is made up of longitudinal generatrices of a plurality of cylindrical rods, referred to as gauge rods, held parallel to one another on a rigid piece, the piece borne by the frame (not shown) of the measuring apparatus 4 equipped with the displacement device according to the invention.

In general, the measurement of the length of a block 3 is carried out by means of two opposite sensing elements 4A, 4B which are placed in contact each on one of the opposite faces 2A, 2B, 3A, 3B determining the length, and this after the block to be measured has been brought between these elements.

The apparatus comprises a control means, in particular of automatic manner, with a view to, on the one hand, putting the sensing elements in contact with the opposite faces of the block, and, on the other hand, withdrawing these elements when the measurement has been carried out.

As has been mentioned, the measurement of the length of the block 3 is preferably made between points of a plurality of points 3C, 3D, for example, for a right-angled, parallelepiped-shaped block 3, between points 3C, situated at the vertices of diagonals of opposite faces 3A, 3B, and between points 3D, situated at the intersection of the diagonals of these faces.

In a noteworthy way, the template 6 is made up of at least two separate parts 61, 62 which are able to be displaced separately from one another, of which:

a first part 61, on the one hand, that comprises the stops 61A intended for lateral maintenance of the reference block 2 on the measuring table 5, and at least one other part, referred to as the second part 62, that comprises the stops intended for lateral maintenance of at least one block to be checked 3.

In another noteworthy way, the template 6 is made up of at least two separate parts 61, 62, which are able to be displaced separately from one another, of which:

a first part 61, on the one hand, that comprises the stops 61A intended for lateral maintenance of the reference block 2 on the measuring table 5, and, on the other hand, cooperates with a means 7 for guiding along the first axis A1 of displacement, at least one other part, referred to as the second part 62, that comprises the stops intended for lateral maintenance of at least one block to be checked 3, on the one hand, and, on the other hand, cooperates with a means 8 for guiding along two cross axes A2, A3 parallel to the measuring table 5, at least one A2 of these axes A2, A3 being parallel to the said first axis A1.

The invention also has as its subject matter a method of displacement of at least two objects for comparison of dimensions of these objects by means of a measuring apparatus.

Figure 3B:
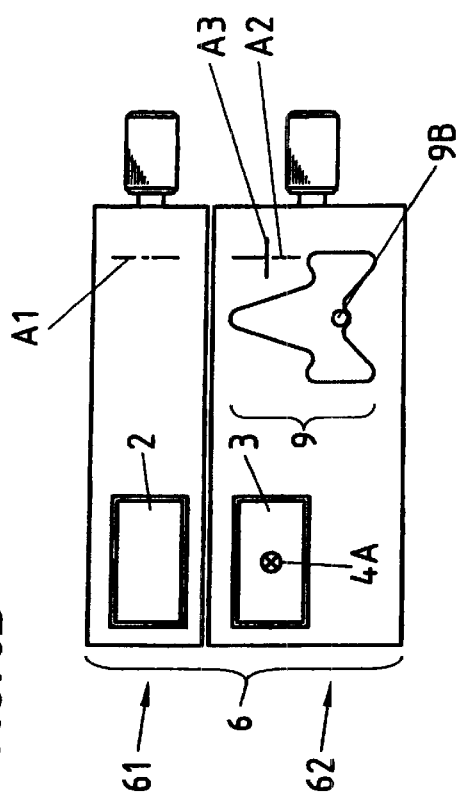
Figure 3C:
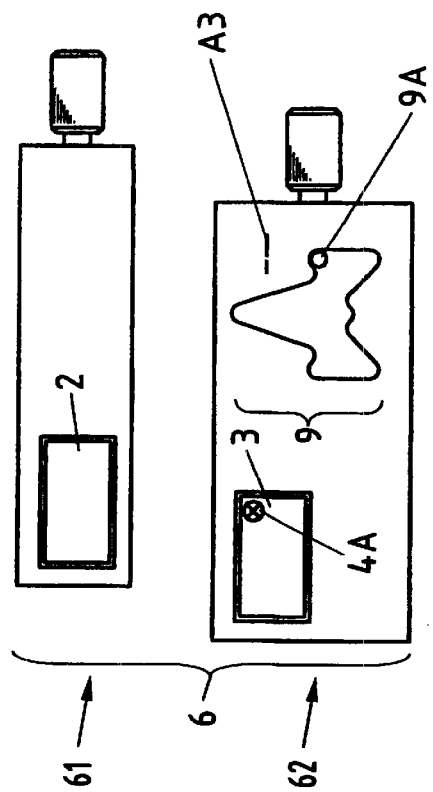

According to this method:

the reference block 2 is disposed in a cutout of the first part 61 of the template and at least one block to be checked 3 is disposed in the cutout of a second part 62 of the template, then by displacement of the first part 61 of the template 6 (FIGS. 1, 3A), the reference block 2 is brought into contact with at least one sensing element 4A, 4B in particular, then by action upon the second part 62 of the template 6, the first part 61 of the template 6 and the reference block 2 are displaced in order that a block to be checked 3 is substituted therefor (FIG. 3B), then furthermore by displacement of the second part 62 of the template 6, the block to be checked is displaced toward at least one other measurement position (FIG. 3C).

It is understood that, after the reference block 2 has been placed in contact with at least one sensing element 4A, 4B in particular, this block 2 is able to be displaced, by displacement of the first part 61 of the template 6 (FIGS. 1, 3A), so that a block to be checked 3 is substituted therefor (FIG. 3B), by displacement of a second part 62 of the template 6, then block 3 is displaced in at least one other measurement position (FIG. 3C).

It is likewise understood that the reference block 2 and the block to be checked 3, as need be, can be displaced independently of one another.

During the displacements of a second part 62 of the template 6, the reference block 2 is thus no longer uselessly shifted on the measuring table 5.

This can be noted in the drawing by studying FIGS. 3B and 3C.

The guide means 7, 8 have not been shown in detail.

One skilled in the art knows how to select means suitable for the guiding sought.

A reference block of the same nominal dimension as the blocks to be checked will preferably be used.

In a noteworthy embodiment of the method according to the invention:

on the one hand, set in operation are:

a reference block of nominal dimension distinct from the nominal dimension of the blocks to be checked 3, i.e. a reference block 2 whose nominal dimension displays a predetermined notable divergence from the block to be checked 3, and a measuring apparatus 4 of which at least one sensing element 4A, 4B can be displaced in the direction of measurement with great precision over a large distance, such distance as the divergence in nominal dimension which separates the reference block from a block to be checked, and on the other hand, after having calibrated the measuring apparatus 4 by pressing of at least one sensing element on the reference block 2, the said sensing element is displaced by at least the divergence in dimension which separates the nominal dimension of the reference block 2 from the nominal dimension of the block to be checked 3, then measurements are carried out by taking into account the value of the displacement of the sensing element which is due to the difference in nominal dimensions.

Designated by the expression "by taking into account" is an operation of processing of the information derived from the sensing element or elements, which makes it possible for the measuring apparatus, particularly with a view to display of the measurement, to ignore the value of the displacement ordered to compensate for the known divergence in nominal dimensions between the reference block and the block to be checked.

In a preferred embodiment of the invention a measuring apparatus 4 is set in operation equipped with at least one high precision sensor over a long course, for example an incrementation type sensor.

In another noteworthy way:

the template 6 is made up of at least two separate parts 61, 62 which are able to be displaced separately from one another, of which a first part 61 and at least one second part 62, which are juxtaposable and, to this end, display vis á vis stops 61B, 62B, referred to as displacement stops, intended to cooperate in such a way that one of the parts 61, 62 is able to push the other during a displacement along two parallel axes A1, A2, the first part 61 of the template 6, on the one hand, comprises the stops 61A intended for lateral maintenance of the reference block 2 on the measuring table 5 and, on the other hand, cooperates with a means 7 for guiding along the first axis Al of displacement, each second part 62 of the template, on the one hand, comprises the stops 62A intended for lateral maintenance of at least one block to be checked 3, and, on the other hand, cooperates with a means 8 for guiding along two cross axes A2, A3 parallel to the measuring table 5, at least one A2 of these axes A2, A3 being parallel to the said first axis A1.

The device 1 preferably comprises a means 9 of assistance in guiding the displacement of the template 6 along a preferred route for causing a simultaneous displacement of the two blocks 2, 3.

This assistance means 9 comprises the elements 9A and 9B which make it possible to ensure:

the positioning of the reference block 2 at the level of at least one sensing element 4A, 4B of the measuring apparatus 4 in order to allow a reading on this block by pressing of the said sensing element 4A, 4B on at least one of the opposite faces 2A, 2B of the block 2, the displacement of the reference block 2 and that of at least one block 3 to be checked, in such a way as to substitute the one for the other and to present the block to be checked at the level of the sensing element 4A, 4B, and this successively in each of the reading positions.

The assistance means 9 conventionally comprise two distinct functional elements 9A, 9B, viz., on the one hand, a cam track 9A which determines a preferable route for the blocks 2, 3, and, on the other hand, a reading element 9B for this cam track 9A, these elements 9A, 9B being connected to functional elements of the device 1 in such a way as to cooperate and at least favor a route for the template 6 and thus for the displacement of the blocks toward at least one sensing element 4A, 4B.

The cam track 9A is preferably made up of a flank 9A of a cutout 62C made in the template 6, on the one hand, and, on the other hand, of a reading element 9B consisting of a roller at least indirectly connected to the measuring table 5.

In a noteworthy way, it is at least one second part 62 of the template 6 which is placed under the influence of the means 9 of assistance in guiding the displacement along the preferred route.

In a further noteworthy way, when the device 1 comprises a means 9 of assistance in guiding the displacement of the template 6 along a preferred route to cause a simultaneous displacement of the two blocks 2, 3 along at least one axis A2, A3, it is a second part 62 of the template 6 which comprises at least one of the elements 9A, 9B of this means 9.

In a noteworthy way:

the first part 61 of the template 6 is made up of a plate 61, of substantially right-angled quadrilateral shape, which comprises, on the one hand, a cutout, the peripheral face of which constitutes the stops 61A intended for lateral maintenance of the reference block 2, and, on the other hand, cooperates with a means 7 of guiding along the first axis A1 of displacement, at least one second part 62 of the template 6 is made up of a plate 62 which comprises, on the one hand, a cutout, the peripheral face of which constitutes the stops 62A intended for the lateral maintenance of at least one block to be checked 3, and, on the other hand, cooperates with a means 8 of guiding along two cross axes A2, A3 parallel to the measuring table 5, at least one A2 of these axes A2, A3 being parallel to the said first axis A1, the plates are oriented and connected to their guide means in such a way that they display vis á vis two edges 61B, 62B able to cooperate so that one of the parts 61, 62 is able to push the other during a displacement along two parallel axes A1, A2.

Preferably, the plate which makes up the second part 62 of the template 6 equipped with the means 9 of assistance in guiding comprises a cutout 62C whose flank 9A constitutes the cam track 9A, and moreover the reading element 9B consists of a roller connected at least indirectly to the measuring table 5.

Each of the plates 61, 62 preferably comprises a control button 61D, 62D.

What is claimed is:

1. Device for displacement of at least two objects including a reference block and a block to be checked, with a view to comparison of dimensions of the reference and the to be checked blocks by a measuring apparatus, said displacement device comprising:

a measuring table defining a common supporting and sliding plane for the reference block and the block to be checked and for one of their faces concerned by the measurement, a template, which is, on one hand, situated above the measuring table and bears stops disposed for maintaining the blocks in a predetermined position and orientation with respect to the measuring apparatus, by cooperating with lateral faces of the blocks, while preserving their free support on the measuring table, and, on the other hand, is movable above the measuring table, the template being made up of at least two separate parts to be displaced separately from one another and including a first part including at least one of the stops for lateral maintenance of the reference block on the measuring table, and at least one second part of said at least two separate parts including at least one of the stops for lateral maintenance of at least one block to be checked.

2. Device according to claim 1, wherein at least one said second part of the template is placed, at least indirectly, under the influence of means of assistance in guiding the displacement of the template. along a course for causing a simultaneous displacement of the blocks of reference and to be checked along at least one axis.

3. Device according to claim 2, wherein the second part of the template comprises at least one element of the assistance means.

4. Device for displacement of at least two objects including a reference block and a block to be checked, with a view to comparison of dimensions of the reference and the to be checked blocks by a measuring apparatus, said displacement device comprising:

a measuring table defining a common supporting and sliding plane for the reference block and the block to be checked and for one of their faces concerned by the measurement, a template, which is, on one hand, situated above the measuring table and bears stops disposed for maintaining the blocks in a predetermined position and orientation with respect to the measuring apparatus, by cooperating with lateral faces of the blocks, while preserving their free support on the measuring table, and, on the other hand, is movable along at least one axis of displacement parallel to the supporting plane in such a way as to allow a displacement of the blocks on the measuring table, the template being made up of at least two separate parts to be displaced separately from one another, a first part of said at least two separate parts including at least one of the stops for lateral maintenance of the reference block on the measuring table and cooperating with means for guiding along one of the at least one axis of displacement, at least one second part of said at least two separate parts including at least one of the stops for lateral maintenance of at least one block to be checked and cooperating with means for guiding along two cross axes parallel to the measuring table, at least one of the two cross axes being parallel to said one of said at least one axis.

5. Device according to claim 4, wherein the first part of the template is made up of a plate, of substantially right-angled quadrilateral shape, which comprises, on one hand, a cutout, a peripheral face of which constitutes the at least one of the stops intended for lateral maintenance of the reference block, and, on the other hand, cooperates with means for guiding along the one axis of displacement, the at least one second part of the template is made up of a plate which comprises, on one hand, a cutout, a peripheral face of which constitutes the at least one of the stops intended for the lateral maintenance of at least one block to be checked, and, on the other hand, cooperates with means for guiding along two cross axes parallel to the measuring table, at least one of the two cross axes being parallel to the one axis, the plates are oriented and connected to the guide means in such a way that they display via a vis two edges able to cooperate so that one of the first and second parts is able to push the other during a displacement along two parallel axes.

6. Device according to claim 5, wherein the plate, which makes up the second part of the template equipped with means for assistance in guiding including a cutout a flank of which constitutes a cam track (9A), and a reading element consists of a roller connected at least indirectly to the measuring table.

7. Device for displacement of at least two objects including a reference block and a block to be checked, with a view to comparison of dimensions of the reference and the to be checked blocks by a measuring apparatus, said displacement device comprising:

a measuring table defining a common supporting and sliding plane for the reference block and the block to be checked and for one of their faces concerned by the measurement, a template, which is, on one hand, situated above the measuring table and bears stops disposed for maintaining the blocks in a predetermined position and orientation with respect to the measuring apparatus, by cooperating with lateral faces of the blocks, while preserving their free support on the measuring table, and, on the other hand, is movable along at least one axis of displacement parallel to the supporting plane in such a way as to allow a displacement of the blocks on the measuring table, the template being made up of at least two separate parts to be displaced separately from one another, a first part of said at least two separate parts and at least one second part of at least two separate parts being juxtaposable and, to this end, display vis à vis two of said stops being displacement stops, intended to cooperate in such a way that one of the first and second parts being able to push the other during a displacement along two parallel axes, the first part of the template, on one hand, comprises at least one of the stops intended for lateral maintenance of the reference block on the measuring table and, on the other hand, cooperates with a means for guiding along a first axis of the at least one axis of displacement, each said second part of the template, on one hand, comprises at least one of the stops intended for lateral maintenance of at least one block to be checked, and, on the other hand, cooperating with means for guiding along two cross axes parallel to the measuring table, at least one of the two cross axes being parallel to said one of said at least one axis.

8. Method for the comparison of dimensions of objects by a measuring apparatus equipped with a device for displacement of at least two objects including a reference block and a block to be checked, the method comprising disposing the reference block in a cutout of a first part of a template, and at least one block to be checked being disposed in a cutout of a second part of the template, displacing the first part of the template so that the reference block is brought into contact with at least one sensing element, displacing by action upon the second part of the template, the first part of the template and the reference block so that a block to be checked is substituted therefor, and displacing the second part of the template so that, the block to be checked is displaced toward at least one other measurement position.

9. Method according to claim 8, wherein the at least one sensing element is displaced in a direction of measurement by pressing of the at least one sensing element on the reference block, the at least one sensing element is displaced by at least a divergence in dimension which separates a nominal dimension of the reference block from a nominal dimension of the block to be checked so that measurements are carried out by taking into account a value of displacement of the at least one sensing element which is due to a difference in the nominal dimensions.

10. Method according to claim 9, wherein the a measuring apparatus is equipped with at least one high precision incremental sensor.

* * * * *